United States Patent

[11] 3,544,117

| [72] | Inventor | Spencer Lewis Bingham<br>396 N. Thomas St., Orange, California 92667 |
|---|---|---|
| [21] | Appl. No. | 713,641 |
| [22] | Filed | March 18, 1968<br>Continuation-in-part of Ser. No. 572,647, Aug. 10, 1966, abandoned. |
| [45] | Patented | Dec. 1, 1970 |

[54] TOOL-HOLDING AND ALIGNING DEVICE
11 Claims, 6 Drawing Figs.

[52] U.S. Cl............................................. 279/6
[51] Int. Cl............................................. B23b 31/34, B23b 31/36
[50] Field of Search.................................... 279/1(J), 1(L), 6, 16, 17, 18; 287/12, 14

[56] References Cited
UNITED STATES PATENTS

| 1,308,681 | 7/1919 | Prideaux ..................... | 279/16 |
| 2,463,857 | 3/1949 | Dietz............................. | 279/6 |

*Primary Examiner*—Robert C. Riordon
*Assistant Examiner*—Donald D. Evenson
*Attorney*—Gausewitz & Carr ABSTRACT: A tool-holding and aligning device that includes a tool holder circumscribed by a tubular member, the tool holder being pivotal relative to the tubular member and adjusted pivotally by opposed screws, and a second tubular member circumscribing the first tubular member and including opposed screws for effecting transverse movement of the first tubular member and, hence, the cutting tool relative to the second tubular member, for thereby obtaining lateral centering alignment.

Patented Dec. 1, 1970

3,544,117

INVENTOR.
SPENCER LEWIS BINGHAM
BY
ATTORNEYS

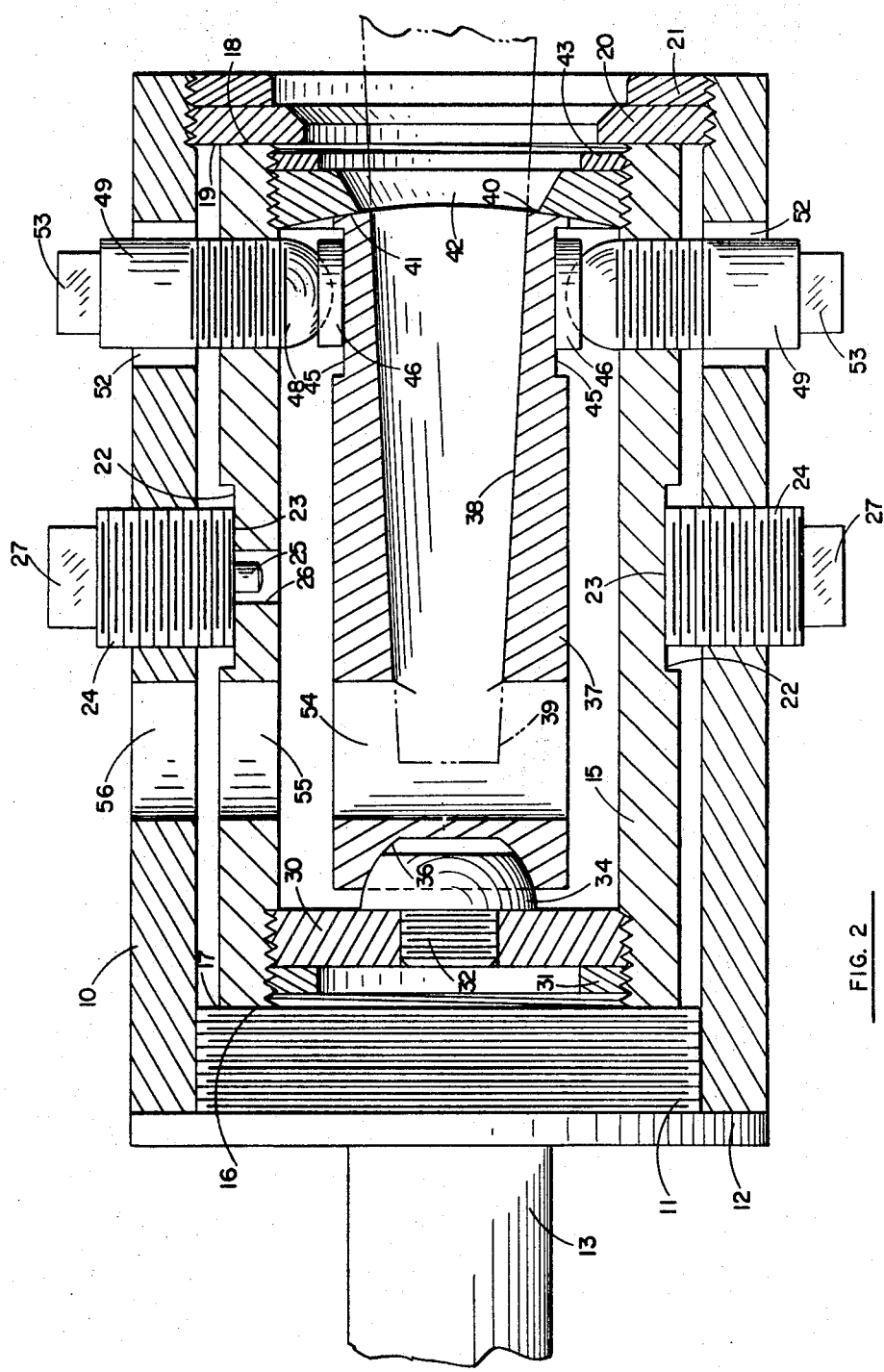

*INVENTOR.*
SPENCER LEWIS BINGHAM

BY

ATTORNEYS

3,544,117

TOOL-HOLDING AND ALIGNING DEVICE

REFERENCE TO PARENT APPLICATION

This application is a continuation-in-part of my copending U.S. Pat. application Ser. No. 572,647, now abandoned filed Aug. 10, 1966, for Machine Shop Tooling.

BACKGROUND OF THE INVENTION

1. Field of the Invention

This invention pertains to a tool for holding and alining cutting tools in a lathe or the like.

2. The Prior Art

It is necessary in using precision cutting tools, such as drills, step drills, reamers, step reamers and taps and lathes, to obtain precise alinement of the cutting tools as they are mounted. Otherwise, it is impossible to obtain diameters in the workpiece held to close tolerances, particularly for deeper holes. The alinement required is both axial and lateral. In other words, the axis of the cutting tool must be alined with the intended axis of the opening of the workpiece. Lateral centering also is necessary in order to position the opening in the proper location. Turret and engine lathes almost never provide true alinement of the tools. This occurs from various factors, such as the settling of the machine on the floor with resulting twist of the bed, and from wear as the machine is used. Also, it is difficult in any event to provide in a large machine tool the perfection required for alinement of the cutting tools, even in the absence of settling or wear or other factors resulting in misalignment.

Consequently, the machine tool operator has had to devote a great deal of setup time toward obtaining alinement of the cutting tools. The conventional procedure has been to provide shims between the face of the tool holder port and the face of the turret of the turret lathe for initially securing axial alinement. The assembly then is hammered laterally into center alinement against the pressure of large mounting screws. During this time, the axial alinement may be lost. It is a slow and laborious process to secure both axial and lateral adjustment, and frequently many hours must be spent in the setup operation. Moreover, the adjustment often is not maintained during operation of the machine, and there is no ready means of readjustment.

SUMMARY OF THE INVENTION

The present invention overcomes these shortcomings of the prior art, resulting in a means by which tool alinement is achieved very rapidly and easily, and is securely maintained during operation. The device includes a tool-holding member that receives the cutting tool and is held within a tubular member that circumscribes it. One end of the tool-holding member is pivotal about a ball joint, while near the other end opposed screws permit rotational adjustment of the tool-holding member relative to the tubular member that is around it. A second tubular member is around the first tubular member, and includes a shank at one end for mounting in a turret or other location. The first tubular member is movable laterally relative to the second tubular member, which movement is accomplished by opposed screws extending through the second tubular member and engaging the first tubular member. Radial guide surfaces at the ends of the inner tubular member maintain it in a lateral path. By first inserting the cutting tool into the tool-holding member and then manipulating the two sets of opposed screws, it is possible to obtain both axial and center alinement of the cutting tool in a very short time.

An object of this invention is to provide an improved arrangement for holding and alining tools.

Another object of this invention is to provide a device by which axial and lateral alinements of a cutting tool with a workpiece are rapidly and easily obtained.

A further object of this invention is to provide a device for holding and alining a cutting tool by which the cutting tool is securely held so that the alinement will be maintained during use of the cutting tool.

Yet another object of this invention is to provide a tool-holding and alining device which allows a cutting tool to be alined axially, followed by alinement of the cutting tool laterally, in which the axial alinement will not be disturbed during setting of the lateral alinement.

These and other objects will become apparent from the following detailed description taken in connection with the accompanying drawing.

BRIEF DESCRIPTION OF THE DRAWING

FIG. 2 is an enlarged longitudinal sectional view taken along line 2-2 of FIG. 1;

DESCRIPTION OF THE PREFERRED EMBODIMENT

Figure 1:
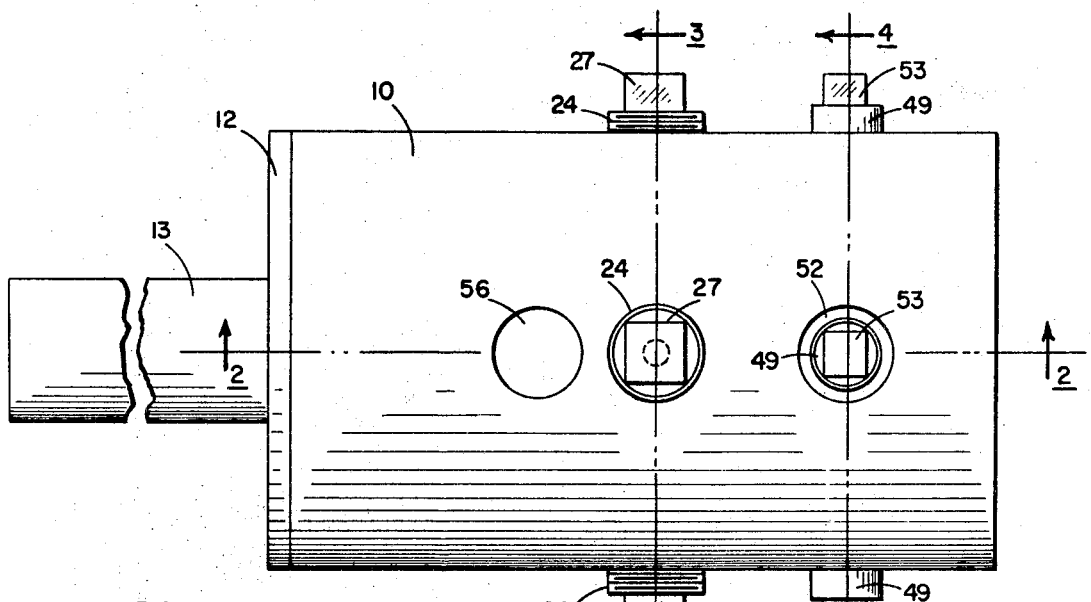
FIG. 1 is a top plan view of the device of this invention.
Figure 4:
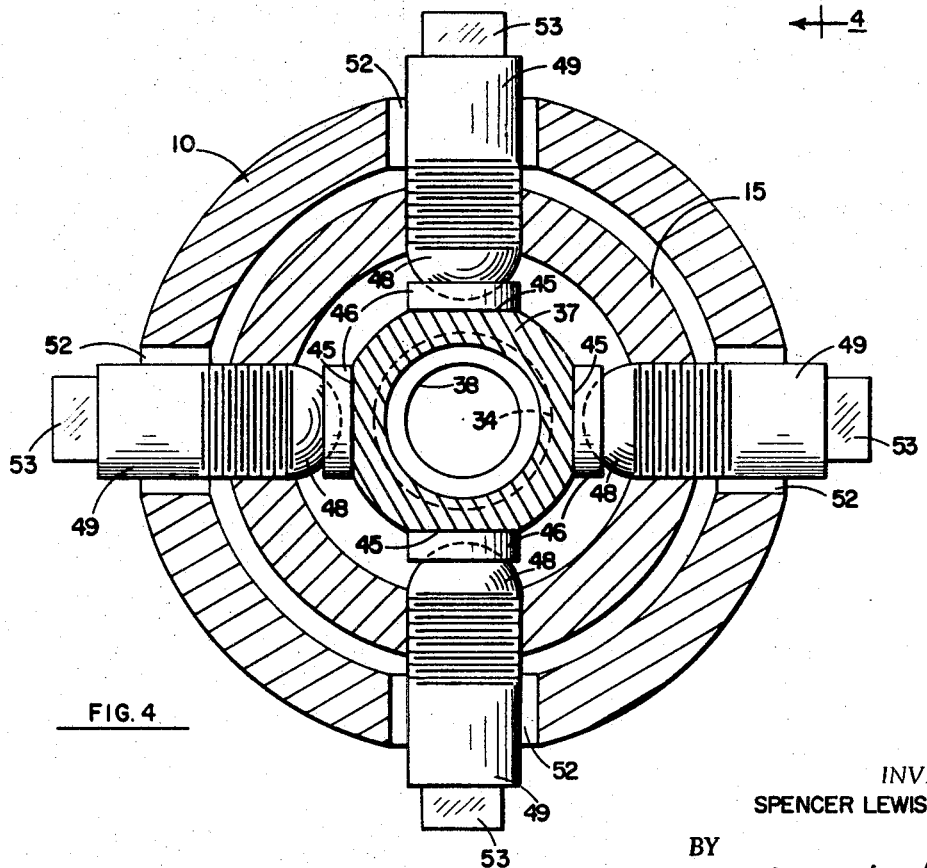
FIG. 4 is an enlarged transverse sectional view taken along line 4-4 of FIG. 1.
Figure 3:
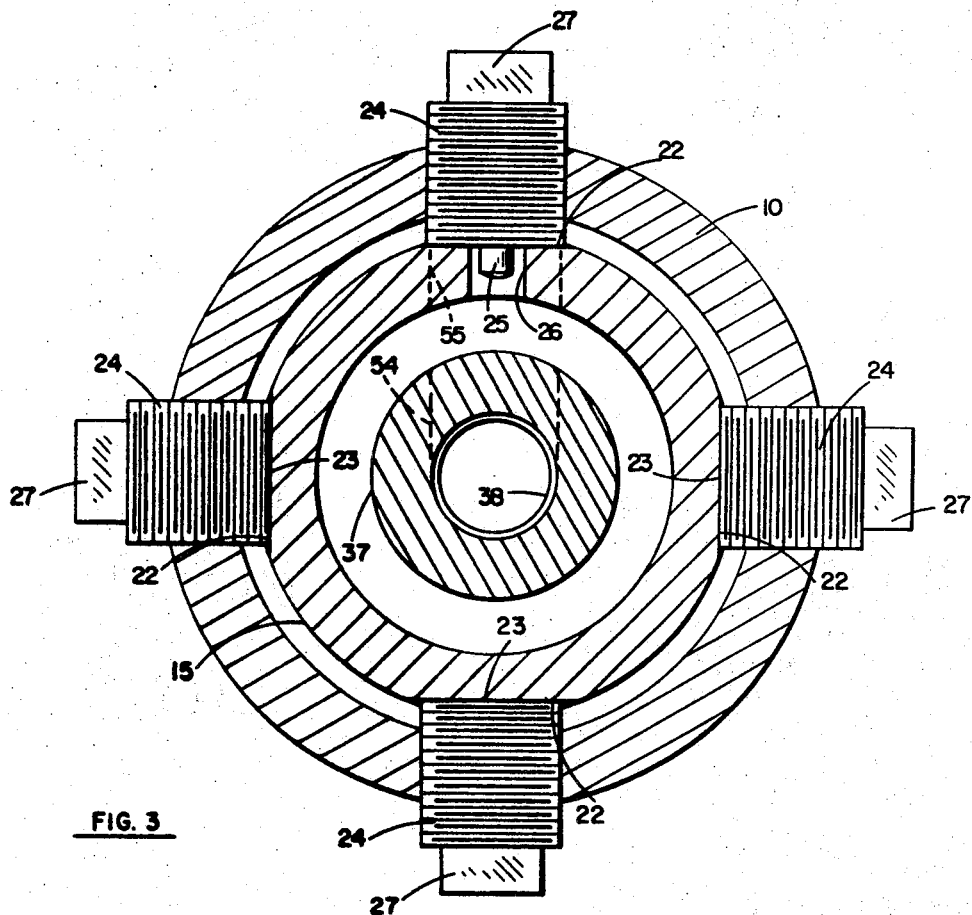
FIG. 3 is an enlarged transverse sectional view taken along line 3-3 of FIG. 1.

The device of this invention includes an outer tubular member 10, which is internally threaded at the left-hand end, as the device is shown, where it is engaged by the threaded inner portion 11 of a mounting base 12. A shank 13 projects axially outwardly from the center of the base member 12 and is adapted for connection to a machine tool. Typically, this is used in mounting the device on the hexagonal turret of a turret lathe.

An additional tubular member 15 is received within the outer tubular member 10, one end surface 16 of the tubular member 15 engaging the flat end surface 17 of the threaded extension 11 of the base 12. The opposite end 18 of the tubular member 15 is engaged by the flat inner face 19 of a retainer ring 20 that is threadably received in the outer end of the tubular member 15. Thus, the ends 16 and 18 of the inner tubular member 15 are held between the radial surfaces 17 and 19. The ends 16 and 18 of the tubular member 15, and the surfaces 17 and 19 that they engage, are held to close tolerances so that the tubular member 15 is maintained in parallelism with the outer tubular member 10. A lock ring 21 may be included to bear against the outer surface of the retainer ring 20.

Around the axial midportion of the inner tubular member 15 are four flat surfaces 22, which are equally spaced apart and parallel to the axis of the tubular member 15. The surfaces 22 are tangent to a cylinder concentric with the tubular member 15. These surfaces are engaged by the inner flat radial ends 23 of four screws 24 that threadably extend through radial openings in the outer tubular member 10. One or more of these screws 24 may include a small projection 25 at its inner end received within an opening 26 in the tubular member 15. This assures a proper connection and positioning of the tubular member 15 relative to the screws 24. The outer ends 27 of the screws 24 are provided with square or hexagonal wrenching surfaces.

By this arrangement, therefore, it is possible to move the inner tubular member 15 laterally relative to the outer tubular member 10 through appropriate manipulation of the screws 24. Tightening or loosening of the spaced screws 24 will push the member 15 in any desired direction laterally relative to the outer tubular member 10. Universal radial movement is possible. At the same time, by being held between the radial surfaces 17 and 19, the tubular member 15 is confined to movement in a direction radial relative to the outer tubular member 10, so that its axis will either coincide with or be parallel to the axis of the tubular member 10, regardless of the lateral positioning of the tubular member 15.

Adjacent the inner end 16 of the tubular member 15, a support disk 30 is threadably received in the member 15. The outer surface of the disk 30 is engaged by a lock ring 31. A threaded opening is provided in the axis of the disk 30, which receives the threaded shank 32 that extends from a part sphere 34. The member 34 has the contour of a hemisphere with the outer portion cut off. This part sphere is received within a recess 36 in a tubular tool holder 37. The recess 36 has the same radius of curvature as that of the part sphere 34. Thus, the element 34 and the recess 36 form a ball-and-socket joint. The tool holder 37 includes an inwardly tapered opening 38 that is adapted to receive the shank 49 of a cutting tool, such as a step drill or the like. The outer end of the tool holder 37 has a surface 40, which has the contour of a spherical segment, the radius of which has the same center point as that of the surface of the recess 36 and the part sphere 34. The end surface 40 of the tool holder 37 is engaged by the inner surface 41 of a front support ring 42. The surface 41 also is a spherical segment and has the same center point as that of the surface 40, the recess 36 and the member 34. The front support ring 42 is locked into the end of the tubular member 15 by a lock ring 43.

Figure 5:
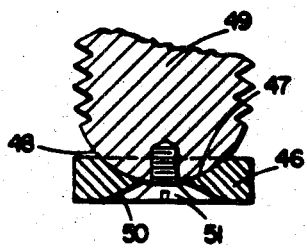
FIG. 5 is a fragmentary sectional view illustrating the arrangement of the pad at the end of the adjusting screw.

Similar to the arrangement for the tubular member 15, the tool holder 37 is provided with four flat areas 45 on its outer periphery. These flat areas are spaced apart 180° and are parallel to the axis of the tool holder 37. They are tangent to a cylinder concentric with the tool holder 37. On each of the flat areas 45 is a pad 46 that has a flat surface for engagement with the flat surface 45. Each pad 46 includes a recess 47, which is defined by a spherical segment (see FIG. 5). The recesses 47 are engaged by the hemispherical ends 48 of screws 49 that extend radially through threaded openings in the circumferential wall of the member 15. Therefore, there is a ball-and-socket connection between each of the adjusting screws 49 and its pad 46.

In order to assure that the pads 46 are held to the ends 48 of the screws 49 when the components are separated, each pad may include a frustoconical opening 50 through which extends a flush head screw 51 that is received in a tapped opening in the end of the screw 49. The flare of the screw head cooperates with the wall of the conical opening 50 to prevent the pad from separating from the screw 49. At the same time, there is clearance between the wall of the opening 50 and the screw 51, so that rotational movement of the pad 46 relative to the screw 49 is permitted. The screws 49 project outwardly through clearance openings 52 in the outer tube 10 so that there is access to their wrenching surfaces 53.

By this construction, the tool holder 37 is rotatable relative to the tubular member 15, and is positioned angularly by the screws 49. By appropriate turning of the screws 49 through their wrenching surfaces 53, the forward end of the tool holder 37 may be moved laterally in any direction. When this occurs, the tool holder 37 pivots about the ball joint at the part sphere 34, rotating about the center point of that element. This movement is made possible because of the spherical contour of the forward edge 40 of the member 37 and the inner surface 41 of the support ring 42, which likewise have the same center point as that of the part sphere 34. Universal pivotal movement is permitted. Also, as the tool holder 37 rotates, the pads 46 maintain a flat engagement with the surfaces 45 as relative rotation takes place between the hemispherical ends 48 of the screws 49 and the recesses 47 of the pads 46.

In operation of the device of this invention, with the shank 13 of the alinement tool held in the turret head or other supporting element, and with the shank 39 of the cutting tool received in the opening 38 of the tubular member 37, the cutting tool may be alined quite readily by the action of the screws 49 and 24. The first step is to aline the tool axially by means of the screws 49. This is done by placing a dial indicator on the cutting surface of the tool and then rotating opposed pairs of the screws 49 until horizontal and vertical zero readings are obtained. During this time, it may be necessary to loosen the support ring 42 slightly to permit the rotational movement of the tool holder 37 to take place. When the axial alinement is complete, the screws 49 are tightened into place so that they will not shift positions.

Next, the center alinement of the tool is achieved through the screws 24. Opposed pairs of these screws are rotated to shift the tubular member 15 and with it the tool holder 37 and the tool 39 laterally relative to the axis of the assembly. In a few moments of time, the proper center alinement is accomplished and the screws 24 are tightened against the tubular member 15 to maintain the alinement. During the center alinement operation, it may be necessary to loosen the front support ring 20 as for the ring 42. It will be loosened only enough to allow the tubular member 15 to be shifted in the lateral direction while still maintaining the straight path defined by the surfaces 17 and 19.

As the center alinement takes place, nothing occurs which will have any effect on the axial alinement previously obtained. Thus, once an alinement has been secured, there is no danger of losing it during the further adjustment of the cutting tool.

As the cutting tool is then used, it will be maintained in precise alinement. Even if a later adjustment should be needed, it can be obtained without difficulty. The tool is held against rotation during its use because the screws 24 and 49 engage flat surfaces on the tubular member 15 and the tool holder 37.

The tool holder 37, the tubular member 15 and the outer tube 10 are provided with alined transverse openings 54, 55 and 56, respectively. These are for removal of the tool 39 from the tool holder, where it becomes wedged tightly in place in the tapered opening 38. A tapered drill drift is inserted into the openings 54, 55 and 56 to engage the inner end of the shank 39, and driven inwardly to dislodge the shank 39 from the opening 38.

Figure 6:
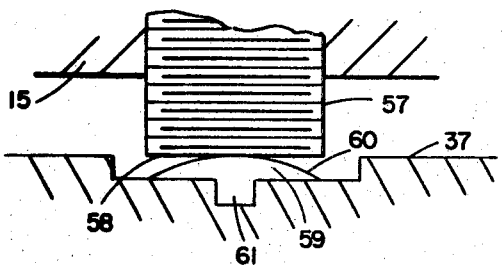
FIG. 6 is a fragmentary view of a modified arrangement between the end of the adjusting screw and the pad that it engages.

If desired, the arrangement for the alinement adjusting screws may be modified for two or more of the screws to include the design shown in FIG. 6. Here, the screws 57 have flat inner ends 58, rather than being hemispherical as for the screws 49. The pads 59 in this instance have convex, semicylindrical outer surfaces 60, which are engaged by the flat inner ends 58 of the screws 57. The axes of the surfaces 60 are transverse to the axis of the tool holder 37. The pads are maintained in position on the flat spots 45 on the tool holder 37 by means of ribs 61 that are received in complementary recesses in the tool holder. As before, this allows the tool holder to pivot relative to the adjustment screws. The engagement between the end surface 58 of the adjustment screw and the semicylindrical surface 60 of the pad provides line contact along the length of the pad. This enables the screw and pad combination to resist torque that is imposed on the tool during its use with particular effectiveness.

The foregoing detailed description is to be clearly understood as given by way of illustration and example only, the spirit and scope of this invention being limited solely by the appended claims.

I claim:
1. A tool-holding and alinement device comprising:
   a member adapted to engage and support a tool;
   a first support means supporting said member;
   means for adjustably allowing universal pivotal movement of said member relative to said first support means;
   first adjustable means for causing such pivotal movement for setting the angular position of said member;
   a second support means supporting said first support means;
   means for allowing universal planar movement of said second support means relative to said first support means without effecting pivotal movement of said member; and
   second adjustable means for causing such universal planar movement for setting the lateral position of said member.
2. A device as recited in claim 1 in which:
   said means for adjustably allowing universal pivotal movement of said member relative to said first support means includes a ball-and-socket joint;

said first adjustable means includes a plurality of threaded elements for effecting pivotal movement of said member about said ball-and-socket joint;

said means for allowing universal planar movement of said second support means relative to said first support means includes surfaces defining a lateral guide path; and said second adjustable means includes a plurality of additional threaded elements for effecting lateral movement of said member along said guide path.

3. A tool-holding and alinement device comprising:

a member adapted to engage and support a cutting tool;

a first tube circumscribing said member;

means on said first tube for supporting said member with freedom for universal pivotal movement of said member relative to said first tube;

means for pivotally adjusting and holding said member relative to said first tube;

a second tube circumscribing said first tube;

means on said second tube for permitting universal movement of said said first tube radially of said second tube; and means for adjusting and holding said first tube radially relative to said second tube.

4. A device as recited in claim 3 in which said means for supporting said member with freedom for universal pivotal movement includes:

ball-and-socket means at one end of said member; and an element having a surface defined by a spherical segment at the opposite end of said member, said member at said opposite end complementarily engaging said surface, said surface having a radius of curvature having the same center point as that of said ball-and-socket means.

5. A device as recited in claim 4 in which said means for pivotally adjusting and holding said member relative to said first tube includes a plurality of threaded elements extending inwardly through said first tube and engaging said member at different locations on said member.

6. A device as recited in claim 5 in which said member includes a plurality of flat surfaces parallel to the axis of said member on the periphery thereof adjacent said threaded elements, said threaded elements including pads on the ends thereof, said pads having flat surfaces complementarily engaging said flat surfaces on said member, said threaded elements including members threadably received in the wall of said first tube and pivotal at the ends thereof relative to said pads.

7. A device as recited in claim 6 in which said members threadably received in the wall of said first tube and said pads include ball-and-socket means for allowing relative pivotal movement thereof.

8. A device as recited in claim 6 in which at least some of said pads include convex semicylindrical outer surfaces, the corresponding members threadably received in the wall of said first tube having substantially flat end surfaces engaging said semicylindrical outer surfaces.

9. A device as recited in claim 3 in which said means on said second tube for permitting universal movement of said first tube radially of said second tube includes radial walls at the opposite ends of said second tube, said first tube including radial ends engaging said radial end walls.

10. A device as recited in claim 9 in which said means for adjusting and holding said first tube radially of said second tube includes a plurality of threaded means extending through said second tube and engaging said first tube at spaced locations on said first tube for effecting movement of said first tube upon rotation of said threaded means.

11. A device as recited in claim 10 in which each of said threaded means includes a screw having a flat radial end surface, said first tube including adjacent each of said screws a flat surface parallel to the axis thereof engaged by said flat end surface of the adjacent screw.